K. A. SIMMON.
SYSTEM OF CONTROL.
APPLICATION FILED MAR. 4, 1916.

1,300,300.

Patented Apr. 15, 1919.

WITNESSES:
R. J. Cudge.
W. B. Wells

INVENTOR
Karl A. Simmon.
BY
Wesley G. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,300,300.   Specification of Letters Patent.   Patented Apr. 15, 1919.

Application filed March 4, 1916. Serial No. 82,100.

*To all whom it may concern:*

Be it known that I, KARL A. SIMMON, a citizen of the United States, and a resident of Edgewood Park, in the county of Allegheny and State of Pennsylvania, have invented a new and useful Improvement in Systems of Control, of which the following is a specification.

My invention relates to systems of control for electric vehicles and particularly to systems for protecting the motors thereof against abnormally high voltages.

One object of my invention is to provide a system of the above indicated character which shall be relatively simple and economical in construction and reliable and effective in operation.

Another object of my invention is to provide a control system which shall disconnect the motors thereof from a source of supply when an abnormally high voltage is applied across any of the motor terminals, as, in case the wheels connected to any of the motors shall slip.

A further object of my invention is to provide a control system of the above indicated class having means for disconnecting the motors from the supply circuit in case of an abnormally high voltage being applied across any of the motor terminals, with a holding circuit for maintaining an open circuit between the supply circuit and the motors until the controller of the system is moved to the off position.

Figure 1:
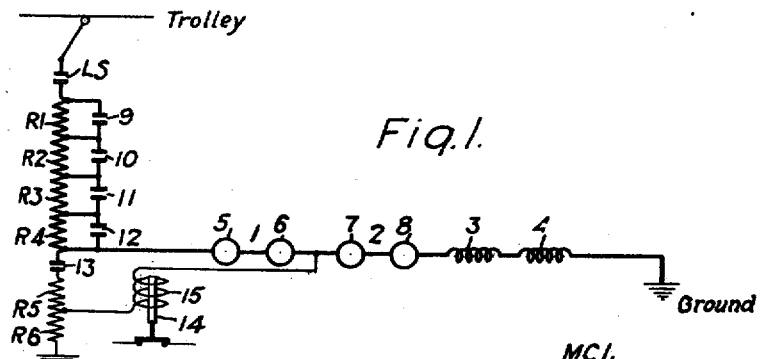
Figure 2:
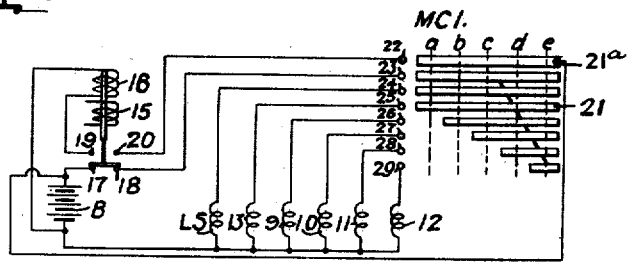
Figure 3:
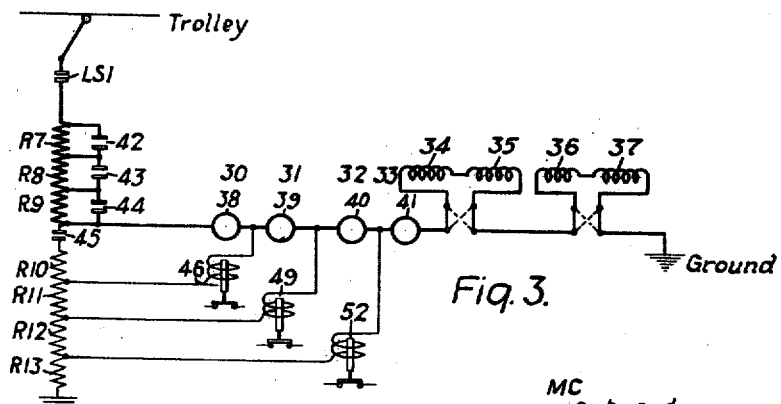
Figure 4:
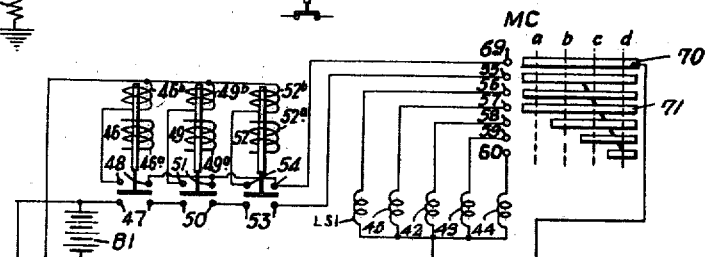

In the accompanying drawing illustrating my invention, Figure 1 is a diagrammatic view of the motor circuits of a system constructed in accordance with my invention; Fig. 2 is a diagrammatic view of control circuits for governing the system illustrated in Fig. 1; Fig. 3 is a modification of the control system illustrated in Fig. 1, and Fig. 4 is a diagrammatic view of the control circuits for the system illustrated in Fig. 3.

Referring to Fig. 1 of the drawing, dynamotors 1 and 2 embodying field windings 3 and 4 and armature windings 5 and 6, and 7 and 8, respectively, are adapted to be connected in series with resistors R1, R2, R3 and R4 across supply conductors marked "Trolley" and "Ground." A plurality of unit switches LS, 9, 10, 11, 12 and 13 are provided for connecting the dynamotors 1 and 2 across the supply circuit for short circuiting the resistors R1, R2, R3 and R4 and for connecting auxiliary resistors R5 and R6 in a shunt circuit around the dynamotors 1 and 2. A relay 14, which is provided with an operating coil 15 and a holding coil 16, is adapted to bridge contact terminals 17 and 18 when deënergized and to bridge contact terminals 19 and 20 when energized. One terminal of the holding coil 15 is connected to the motor circuit at a point between the armature windings of the dynamotors 1 and 2, and the other terminal thereof is connected to the shunt circuit around the dynamotors at a point between the auxiliary resistors R5 and R6. The auxiliary resistors R5 and R6 are so proportioned that the voltage drop through them is equivalent to the voltage drop through the dynamotors 1 and 2, and, when the dynamotors are normally operating, no current will flow through the operating coil 15 of the relay 14.

In Fig. 2 of the drawing, a controller MC1, embodying movable contact segments 21 and 21a and contact fingers 22, 23, 24, 25, 26, 27, 28 and 29, is adapted to complete a circuit from battery B through contact terminals 17 and 18, relay 14 and the coils of the unit switches LS, 9, 10, 11, 12 and 13 when moved to positions a, b, c and d.

Referring to Fig. 3 of the drawing, a plurality of motors 30, 31, 32 and 33, embodying field windings 34, 35, 36 and 37 and armatures 38, 39, 40 and 41, respectively, are adapted to be connected in series with the resistors R7, R8 and R9 across a supply circuit having conductors marked "Trolley" and "Ground". Unit switches LS1, 42, 43, 44 and 45 are provided for connecting motors 30 to 33, inclusive, across the supply circuit, for short circuiting the resistors R7, R8 and R9, and for shunting resistors R10, R11, R12 and R13 around the motors 30 to 33, inclusive. A relay 46, which is provided with an operating coil 46a and a holding coil 46b, is adapted to bridge the contact terminals 47 when deënergized and to bridge the contact terminals 48 when energized. One terminal of the holding coil 46a is connected to the motor circuit between the armatures 38 and 39, and the other terminal thereof is connected to the shunt circuit around the motors at a point between the resistors R10 and R11. A relay 49, which is provided with an operating coil 49a and a holding winding 49b, is adapted to bridge contact terminals 50 when deënergized and to bridge contact terminals 51 when energized. One terminal of the holding coil 49a is connected to the motor circuit at a point between the armatures 39 and 40, and the other terminal thereof is connected to the shunt circuit around the motors at a point between the resistors R11 and R12. A relay 52, which is provided with an operating coil 52a and a holding coil 52b, is adapted to bridge contact terminals 53 when deënergized and to bridge contact terminals 54 when energized. One terminal of the operating coil 52a is connected to the motor circuit at a point between the armatures 40 and 41 and the other terminal thereof is connected to the shunt circuit around the motors at a point between the resistors R12 and R13.

In Fig. 4, a master controller MC, embodying movable contact segments 70 and 71 and contact fingers 69, 55, 56, 57, 58, 59 and 60, is adapted to complete circuits from a battery B1 through the coils of the unit switches LS1 and 42 to 45, inclusive, in case the relays 46, 49 and 52 are deënergized when the controller is moved to positions a, b, c and d.

With the system in the position shown in Figs. 1 and 2, the dynamotors 1 and 2 may be operated by moving the controller MC1 to position a, thus completing a circuit from one terminal of the battery B through contact terminals 17 and 18 of relay 14, contact finger 23, controller segment 21 and in parallel through the contact terminals 24 and 25 and the coils of the unit switches LS and 13 to the other terminal of the battery B. The unit switches LS and 13 are operated to complete a circuit from the trolley through the resistors R1 to R4, inclusive, where the circuit divides, one branch passing through the dynamotors 1 and 2 to the ground and the other branch passing through the unit switch 13 and resistors R5 and R6 to ground. By moving the master controller MC1 successively to the positions b, c, d and e, the unit switches 9, 10, 11 and 12 are operated to successively exclude the resistors R1, R2, R3 and R4 from the circuit of the dynamotors 1 and 2.

In case the wheels attached to one of the dynamotors slip, the potential applied across the terminals of the other dynamotor is materially changed, the balanced voltage relation through the coil of the relay 14 is broken and the relay is operated to bridge contact terminals 19 and 20 and break the connection between the contact terminals 17 and 18. The breaking of the connection between the contact terminals 17 and 18 disconnects the circuit from the battery B through the unit switches LS and 13. The bridging of the contact terminals 19 and 20 closes a holding circuit from one terminal of the battery B through the holding coil 16 and the contact segment 21a of the master controller MC1 to the other terminal of battery B. Thus, the dynamotors 1 and 2 are disconnected from the supply circuit by reason of the line switch LS being deënergized, and the relay 14 is maintained in an operative position by means of the holding coil 16 until the master controller MC1 is moved to the off position to break the circuit of the holding coil 16. Accordingly, whenever the driving wheels slip, which are connected to the dynamotor 1 or the dynamotor 2, the circuit of the dynamotors is broken and is maintained in this condition until the controller is moved to its off position.

With the circuit in the position shown in Figs. 3 and 4 and relays 46, 49 and 52 released, the motors 30 to 33, inclusive, may be operated by moving the master controller MC to position a, whereby a circuit is completed from one terminal of the battery B1 through contact terminals 47 of relay 46, contact terminals 50 of relay 49, contact terminals 53 of relay 52, contact finger 55, controller segment 71 and contact fingers 56 and 57 and coils of the unit switches LS1 and 45 in parallel to the other terminal of the battery B1. The unit switches LS1 and 45 are operated and a circuit completed from the trolley through the resistors R7, R8 and R9 and the motors 30 to 33, inclusive, and the resistors R10 to R13, inclusive, in parallel to ground. In moving the master controller to positions b, c and d, the resistors R7, R8 and R9 are successively excluded from the circuit of the motors. In case the driving wheels connected to any of the motors should slip, the voltage impressed upon the remaining motors will be changed, and, accordingly, the balanced relation of the voltage between the shunt circuit including the resistors R10 to R13, inclusive, and the circuit including the motors 30 to 33, inclusive, will be destroyed. Accordingly, one or more of the relays 46, 49 and 52 will be operated by reason of current passing through one or more of the coils 46ª, 49ª and 52ª. As the relays 46, 49 and 52 are connected in parallel to the master controller MC and operate in a similar manner, it will be necessary to describe the operation of only one of them. In case the relay 46 be operated, the connection between the contact terminals 47 is broken and a circuit completed through the contact terminals 48. The breaking of the connection between the contact terminals 47 will disconnect the coils of the unit switches LS1 and 45 from the battery B1. The closing of contact terminals 48 will establish a holding circuit through the holding coil 46b and the contact segment 70 of the controller MC which circuit will be maintained until the controller is moved to its off position.

In a number of railway systems, direct-current line voltages as high as 5,000 volts have been employed, with motors connected in series. Thus, in case the wheels connected to any set of motors skid, then an abnormally high voltage is applied across the terminals of the remaining motors, so that, in many cases, their windings are materially damaged. In a system constructed in accordance with my invention, the motors are disconnected from the supply circuit whenever the relative potentials applied across the various motor terminals vary.

Although I have illustrated my invention as embodied in certain specific systems, it is to be understood that it is applicable to systems having any number of motors connected in any manner to the axles of the vehicle.

I do not wish to be restricted to the specific connections or arrangement of parts herein set forth, as various modifications in my invention may be made without departing from the spirit and scope thereof. I desire, therefore, that only such limitations shall be imposed as are indicated in the appended claims.

I claim as my invention:

1. In a system of control, the combination with a plurality of electric motors in series-circuit relation and a plurality of resistors connected in shunt to the motors, of means connected between the resistors and the motor terminals for breaking the circuit of said motors in case the relative potentials across the motor terminals vary.

2. In a system of control, the combination with a supply circuit a plurality of motors connected across said supply circuit, and a plurality of accelerating resistors associated with the motors, of means for disconnecting the motors from said supply circuit in case the relative potentials across the motor terminals vary substantially and for preventing the operation thereof till the accelerating resistors are inserted in circuit therewith.

3. In a system of control, the combination with a supply circuit and a plurality of electric motors connected in series across said supply circuit and a plurality of resistors connected in shunt to the motors, of means connected between said resistors and the motor terminals for disconnecting said motors from the supply circuit in case the relative potentials across the motor terminals vary substantially.

4. In a system of control, the combination with a supply circuit, a plurality of electric motors connected in series to said supply circuit, and a plurality of resistors connected in shunt around said motors, of means connected between said resistors and the motor terminals for controlling the circuit of said motors.

5. In a system of control, the combination with a supply circuit, a plurality of motors connected in series to said supply circuit and a controller for governing the operation of said motors, of means connected to said controller for automatically disconnecting said motors from the supply circuit in case the relative potentials across the different motor terminals vary and for preventing the operation of the motors till the controller is moved to the off position.

6. In a system of control, the combination with a supply circuit, a plurality of electric motors connected in series to said supply circuit, and a plurality of accelerating resistors associated with said motors, of means for disconnecting the motors from the supply circuit in case the potential across the terminals of any motor is substantially varied relative to the potentials across the terminal of the other motor and for preventing the operation of said motors till the resistors are inserted in circuit therewith.

7. In a system of control, the combination with a supply circuit, a plurality of motors connected in series to said supply circuit and a controller for governing the operation of said motors, of means for disconnecting said motors from the supply circuit in case the potential across the terminals of any motor is substantially varied relative to the potential across the terminals of the other motors and for preventing the operation of said motors till the control is moved to the off position.

8. In a system of control, the combination with a supply circuit, a plurality of motors connected in series to said supply circuit, and a controller for governing the operation of said motors, of means connected to said controller for automatically disconnecting said motors from the supply circuit in case the relative potentials across the different motor terminals vary and for preventing the operation of the motors till the controller is moved to the off position.

9. In a system of control, the combination with a supply circuit, a plurality of motors connected in series to said supply circuit, a plurality of resistors connected in shunt to said motors, and a plurality of relays bridging the motor and the shunt circuits so as to be energized in case the relative potentials across the different motors vary, and means operated severally by said relays for disconnecting the motors from the supply circuit.

10. In a system of control, the combination with a supply circuit, a plurality of motors connected in series to said supply circuit and a controller for governing the operation of said motors, of a plurality of relays associated with said motors, and means for severally operating said relays to break the control circuits through the controller in case the relative potentials across the different motor terminals vary and for preventing the operation of the motor till the controller is moved to the off position.

11. In a system of control, the combination with a line circuit, a plurality of motors, a plurality of resistors adjacently disposed and connected in series with said motors across the line circuit, and a plurality of auxiliary resistors connected in series with the first named resistors and in shunt to said motors, of relays for bridging the circuits of said auxiliary resistors and of said motors, and means controlled by said relays for breaking the motor circuit in case the relative potentials across the motor terminals vary substantially.

12. In a system of control, a supply circuit, a plurality of motors, resistors connected in series to said motors, a plurality of unit switches for connecting said motors to the supply circuit and for short-circuiting said resistors, a controller for governing the operation of said unit switches and a plurality of auxiliary resistors connected in a shunt circuit around said motors, and a plurality of relays having the terminals thereof connected to the ground terminals of various motors and to points on said resistors so as the same are equi-potential when the relative potential changes through the various motors is constant, of means for severally operating said relays to disconnect said motors from the supply circuit in case the relative potential across the various motor terminals varies and for maintaining the same operated until the controller is moved to its off position.

In testimony whereof, I have hereunto subscribed my name this 29th day of Feb. 1916.

KARL A. SIMMON.